M. H. MONTEITH.
APPLIANCE TO BE USED IN TEACHING TO READ.
APPLICATION FILED JUNE 8, 1911.
1,010,782.
Patented Dec. 5, 1911.
3 SHEETS—SHEET 1.
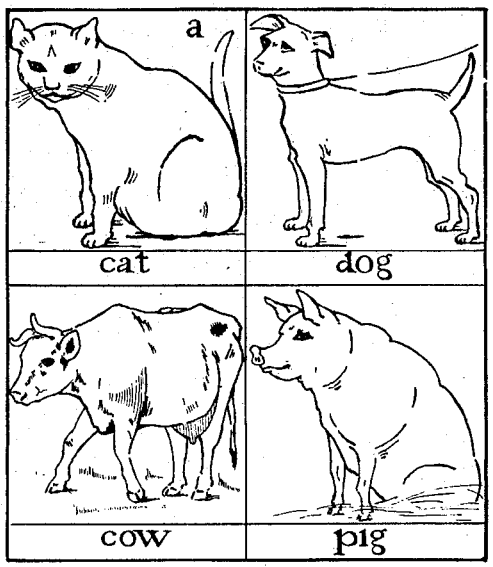
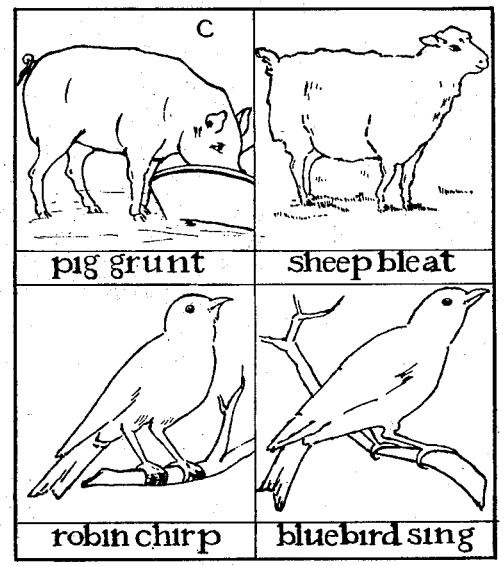
WITNESSES:
INVENTOR
Mary Harris Monteith M. H. MONTEITH.
APPLIANCE TO BE USED IN TEACHING TO READ.
APPLICATION FILED JUNE 8, 1911.

1,010,782.

Patented Dec. 5, 1911.

3 SHEETS—SHEET 2.

FIG 5

This is a robin
Blue eggs are in his nest

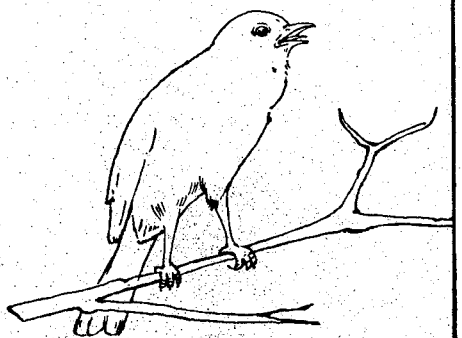

robin

FIG 7

Little Jack Horner sat in a corner
Eating a Christmas pie
He put in his thumb and pulled out a plum
And said "What a good boy am I"

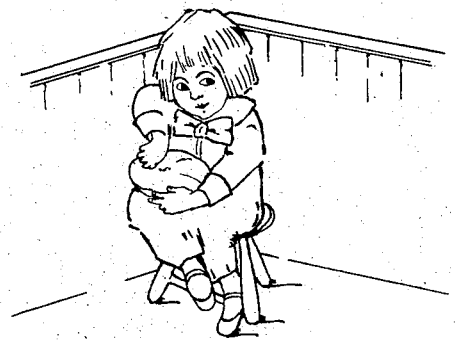

Little Jack Horner

FIG 6

| This | nest | in |
|---|---|---|
| a | Blue | are |
| eggs | is | his |
| robin | This | is |
| nest | his | Blue |
| are | robin | a |
| in | eggs | his |

FIG 8

| Jack | pie | Horner |
|---|---|---|
| sat | thumb | pulled |
| Eating | put | good |
| am I | Little | a in |
| his | Christmas | He a |
| corner | plum | out in |
| said | What | and |

WITNESSES:
Jessie Leslie Cruikshank
Mabel Ford Langton

INVENTOR
Mary Harris Monteith

M. H. MONTEITH.
APPLIANCE TO BE USED IN TEACHING TO READ.
APPLICATION FILED JUNE 8, 1911.

1,010,782.

Patented Dec. 5, 1911.

3 SHEETS—SHEET 3.

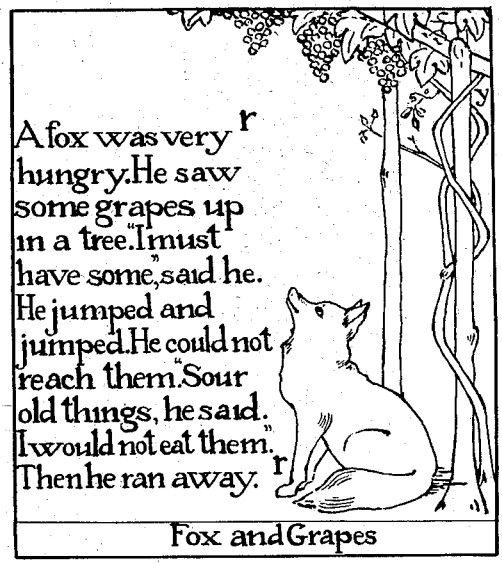

FIG 9

A fox was very r
hungry. He saw
some grapes up
in a tree. "I must
have some," said he.
He jumped and
jumped. He could not
reach them. "Sour
old things, he said.
I would not eat them."
Then he ran away. r Fox and Grapes

FIG 10

| hungry | grapes | very | A |
|---|---|---|---|
| was saw | some in | He up | I |
| fox tree | said a he | must | He |
| jumped | some He | jumped | |
| have not | could old | and said | |
| them eat | reach not | Sour | ran |
| away he | things I | Then | he |

WITNESSES:
Jessie Leslie Cruikshank
Mabel Ford Langton

INVENTOR
Mary Harris Monteith

UNITED STATES PATENT OFFICE.

MARY HARRIS MONTEITH, OF ORANGE, NEW JERSEY.

APPLIANCE TO BE USED IN TEACHING TO READ.

1,010,782. Specification of Letters Patent. Patented Dec. 5, 1911.

Application filed June 8, 1911. Serial No. 632,040.

*To all whom it may concern:*

Be it known that I, MARY HARRIS MONTEITH, a citizen of the United States, residing at Orange, county of Essex, State of New Jersey, have invented a new and useful Appliance to be Used in Teaching to Read, of which the following is a specification.

The object of my invention is to furnish children in the primary schools with seat work which will assist them in learning to read, and afford valuable manual training.

The invention relates to the system of teaching to read in primary schools, whereby the pupil proceeds through progressive steps to put name-words under pictures or outlines, and to select printed words or phrases so as to form sentences, stories, rimes, or poems;—this process to be accomplished by means of: I. A book or set of sheets containing pictures with their appropriate name-words, sentences, rimes, poems or stories, letters, phonograms, numbers or mathematical signs—all to be used by the pupil as models. II. A set or pad of sheets, containing disconnected and separate words or phrases, which the pupil is to cut apart, arrange and paste together, so as to conform to the models selected and assigned from the book or set of model sheets.

In the accompanying drawings illustrating my invention, are shown the successive steps by which the pupil (usually having finished with the kindergarten) arrives at the fourth step of the book.

Figure 1 represents a page taken from the first part of the book. Fig. 2 is a corresponding sheet from the pad. Fig. 3 represents a sheet taken from the second part of the book; and Fig. 4 is a corresponding sheet from the pad. Fig. 5 is a page taken from the third part of the book; and Fig. 6 is the corresponding sheet from the pad. Figs. 7 and 9 represent pages taken from the fourth part of the book, while Figs. 8 and 10 are sheets taken from the pad, and correspond with Figs. 7 and 9 respectively.

First step: With the model for the first step (Fig. 1. taken from the book) before him and a blank sheet to work upon before him, he traces or copies the object Fig. 1. $a$ presented by the model; and from the pad, Fig. 2 cuts out and pastes the right name $b$ under the picture. Under the picture of a cat the word "cat" $b$, $b$, $b$, etc.

Second step: The tracing of a picture Fig. 3 $c$ pasting under it the appropriate name $d$ Fig. 4, with an added verb $e$ Fig. 4. "pig grunt."

Third step: The tracing of a picture Fig. 5 $h$ pasting under it the right name $j$ Fig. 6, then selecting from the pad Fig. 6 a verb $l$ so pasted as to form a sentence. "This is a robin."

Fourth step: The tracing of a picture Fig. 7 $m$ and by cutting the right words from the pad, Fig. 8 $n$—$n$, so arranging the words by pasting, as to construct a rime. Fig. 9 shows the picture taken from the book for tracing and a story $r$—$r$ to be used as a model, while Fig. 10 shows the words $x$—$x$ to be arranged and pasted to form a story to conform to the model in Fig. 9.

The book or set of model sheets, of which Figs. 1, 3, 5, 7, 9, are samples, is to be left loose or to be bound by paper fasteners or otherwise; is to contain pictures in outline or in mass, colored or uncolored, to be traced by the pupils; to contain words, sentences, rimes, stories or poems, numbers, mathematical signs, separate letters of the alphabet or phonograms. The pad or set of paper word-slips to consist of sheets containing disconnected or jumbled words, in print or script; letters of the alphabet, phonograms, mathematical signs or numbers from which the pupil is to select and cut apart. This pad may be in the condition of loose sheets or sheets caught by fasteners; and the individual words, phrases, letters, numbers and signs are to be surrounded by perforated or printed lines, or without such lines, to guide the hand in cutting apart the sections selected. The sheets may be gummed for pasting or ungummed.

I claim as my invention:

A book containing pictures, or representations of objects, explanatory or descriptive texts associated with such pictures or representations, adapted to serve as copies, in combination with readily dissectible sheets of printed texts, identical with the texts in the book, the component members of each text being spaced from each other and from the other texts to facilitate dissection.

In testimony whereof I have hereunto subscribed my name.

MARY HARRIS MONTEITH.

Witnesses:
JESSIE LESLIE CRUIKSHANK,
MABEL FORD LANGTON.